US008873567B1

(12) United States Patent
Mandal et al.

(10) Patent No.: US 8,873,567 B1
(45) Date of Patent: Oct. 28, 2014

(54) PROVIDING ROUTING INFORMATION TO SUPPORT ROUTING BY PORT GROUPS VIA CORRESPONDING NETWORK PATHS

(75) Inventors: Subhasree Mandal, San Jose, CA (US); James Wanderer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/278,111

(22) Filed: Oct. 20, 2011

(51) Int. Cl.
*H04L 12/28* (2006.01)
*H04L 12/26* (2006.01)
*G06F 15/173* (2006.01)

(52) U.S. Cl.
CPC .............. *H04L 12/26* (2013.01); *G06F 15/173* (2013.01)
USPC ........................................................ 370/400

(58) Field of Classification Search
CPC .............................. H04L 12/26; G06F 15/173
USPC ........................................................ 370/400
See application file for complete search history.

(56) References Cited

U.S. PATENT DOCUMENTS 7,277,425 B1    10/2007  Sikdar
7,366,100 B2 *   4/2008  Anderson et al. ............. 370/237
8,139,492 B1 *   3/2012  Peterson et al. .............. 370/238
2005/0163045 A1 *  7/2005  Randriamasy .............. 370/229
2009/0168664 A1   7/2009  Washburn

OTHER PUBLICATIONS

"Office Action for U.S. Appl. No. 13/278,107", (May 24, 2013), Whole Document.
"Final Office Action for U.S. Appl. No. 13/278,107", (Oct. 22, 2013), Whole Document.

* cited by examiner

*Primary Examiner* — Man Phan
*Assistant Examiner* — Nourali Mansoury
(74) *Attorney, Agent, or Firm* — Edward A. Gordon; Foley & Lardner LLP (57) ABSTRACT

Techniques for providing routing information of a first router device supporting multi-path routing from a second router device to a destination node. In an embodiment, multiple egress ports of the first router device are coupled to a second router device, where port groups of the second router device correspond to multiple network paths to the destination node. A routing engine of the first router device may forward packets to the destination node based on a set of entries in a routing table. In another embodiment, the set of entries defines for each of the multiple egress ports of the first router device a correspondence to only a respective one of the port groups of the second router device.

17 Claims, 8 Drawing Sheets

| Routing Table 600 | | |
|---|---|---|
| Index (Destination) | Egress Port | Port Group ID |
| Rt1_1 | PortID_a | PG_A |
| Rt1_2 | PortID_b | PG_A |
| Rt1_3 | PortID_c | PG_B |
| Rt1_4 | PortID_d | PG_C |

Routing Table 710

| Index (Destination) | Egress Port | Port Group ID |
|---|---|---|
| Rt1_11 | PortID_a | PG_A |
| Rt1_12 | PortID_b | PG_A |
| Rt1_13 | PortID_c | PG_B |
| Rt1_14 | PortID_d | PG_C |

715

Routing Table 720

| Index (Destination) | Egress Port | Port Group ID |
|---|---|---|
| Rt1_21 | PortID_a | PG_A |
| Rt1_22 | PortID_b | PG_A |
| Rt1_23 | PortID_c | PG_B |
| Rt1_24 | PortID_d | PG_C |

725

Routing Table 730

| Index (Destination) | Egress Port | Port Group ID |
|---|---|---|
| Rt1_31 | PortID_a | PG_A |
| Rt1_32 | PortID_b | PG_A |
| Rt1_33 | PortID_c | PG_B |
| Rt1_34 | PortID_d | PG_C |

735

Routing Table 740

| Index (Destination) | Egress Port | Port Group ID |
|---|---|---|
| Rt1_41 | PortID_a | PG_A |
| Rt1_42 | PortID_b | PG_A |
| Rt1_43 | PortID_c | PG_A |
| Rt1_44 | PortID_d | PG_A |

| Router 2 Routing Table 800 | |
|---|---|
| Index (Destination, Port Group ID) | Egress Port |
| Rt2_11 | PortID_1 |
| Rt2_12 | PortID_2 |
| Rt2_13 | PortID_3 |
| Rt2_14 | PortID_4 |
| | |
| Rt2_21 | PortID_5 |
| Rt2_22 | PortID_6 |
| Rt2_23 | PortID_7 |
| Rt2_24 | PortID_8 |
| Rt2_25 | PortID_9 |
| Rt2_26 | PortID_10 |
| Rt2_27 | PortID_11 |
| Rt2_28 | PortID_12 |
| | |

815 brackets rows Rt2_11 through Rt2_14
825 brackets rows Rt2_21 through Rt2_28

| Router 2 Routing Table (cont'd) 800 | |
|---|---|
| Index (Destination, Port Group ID) | Egress Port |
| Rt2_301 | PortID_13 |
| Rt2_302 | PortID_14 |
| Rt2_303 | PortID_15 |
| Rt2_304 | PortID_16 |
| Rt2_305 | PortID_17 |
| Rt2_306 | PortID_18 |
| Rt2_307 | PortID_19 |
| Rt2_308 | PortID_20 |
| Rt2_309 | PortID_21 |
| Rt2_310 | PortID_22 |
| Rt2_311 | PortID_23 |
| Rt2_312 | PortID_24 |
| | |

835 brackets rows Rt2_301 through Rt2_312

FIG. 8

PROVIDING ROUTING INFORMATION TO SUPPORT ROUTING BY PORT GROUPS VIA CORRESPONDING NETWORK PATHS

BACKGROUND

1. Technical Field

Embodiments of the subject matter described in this specification relate generally to computer networks. Certain embodiments relate to techniques for providing routing information for routing packets to a destination node.

2. Background Art

In equal-cost multi-path (ECMP) routing techniques, multiple network paths to the same network node are identified as being associated with the same level of strategic cost (or value) in terms of route selection. Conventional ECMP techniques, such as those discussed in the Network Working Group's Request for Comments (RFC) 2991 (November, 2000) and RFC 2992 (November, 2000), are typically concerned with trying to send on each of the network paths identified as being of equal-cost the same amount of traffic to the destination node.

As data networks trend towards increased size, complexity and speed, mechanisms such as those for implementing ECMP are burdened with the increasingly difficult task of supporting sufficiently fast and efficient routing in such networks. For example, the number of entries in a routing table of a conventional router device tends to grow exponentially with an increasing number of utilized network paths and increasingly complex routing configurations in increasingly large-scale networks. Moreover, the overhead of managing and searching such a large routing table impacts router operations which are under increasingly time-constrained performance parameters.

SUMMARY OF THE INVENTION

Embodiments discussed herein include various techniques for providing routing information to support multi-path routing of packets to a destination node. In an embodiment, a router device comprises at least a first routing engine to detect first packets which are to be sent to a destination node. Multiple egress ports of the router device may be coupled to the first routing engine, where the egress ports each couple the router device to another router device having multiple port groups. The multiple port groups may each be associated with a different respective network path to the destination node.

In an embodiment, the router device may also include at least a first routing table including an entry set to support multi-path routing of packets to the destination node. Each entry of the entry set may, for example, correspond to a respective one of the multiple egress ports and to a respective one of the port groups. The entry set may, in an embodiment, define for each of the multiple egress ports a correspondence to only a respective one of the port groups.

The first routing engine may forward the received first packets based on the entry set of the first routing table. In an embodiment, forwarding the first packets includes, for each of the received first packets, identifying a respective entry of the entry set, tagging the packet with an identifier of a port group corresponding to the identified respective entry, and sending the tagged packet via the egress port corresponding to the identified respective entry.

The first routing engine may, in certain embodiments, be one of multiple routing engines of the router device. Moreover, the first routing table may be one of multiple routing tables of the router device—e.g. where each of the multiple routing tables corresponds to a different respective one of the multiple routing engines. Each of the multiple routing tables may, for example, include a respective entry set to support multi-path routing of packets to the destination node. For any given one of the entry sets, each entry of the entry set may correspond to a respective one of the multiple egress ports and to a respective one of the port groups. The multiple routing engines may variously send packets to the second router device based on the respective entry sets of their corresponding routing tables.

BRIEF DESCRIPTION OF THE DRAWINGS

One or more embodiments of the subject matter described in this specification are illustrated by way of example, and not by way of limitation, in the figures of the accompanying drawings.

DETAILED DESCRIPTION

Figure 1:
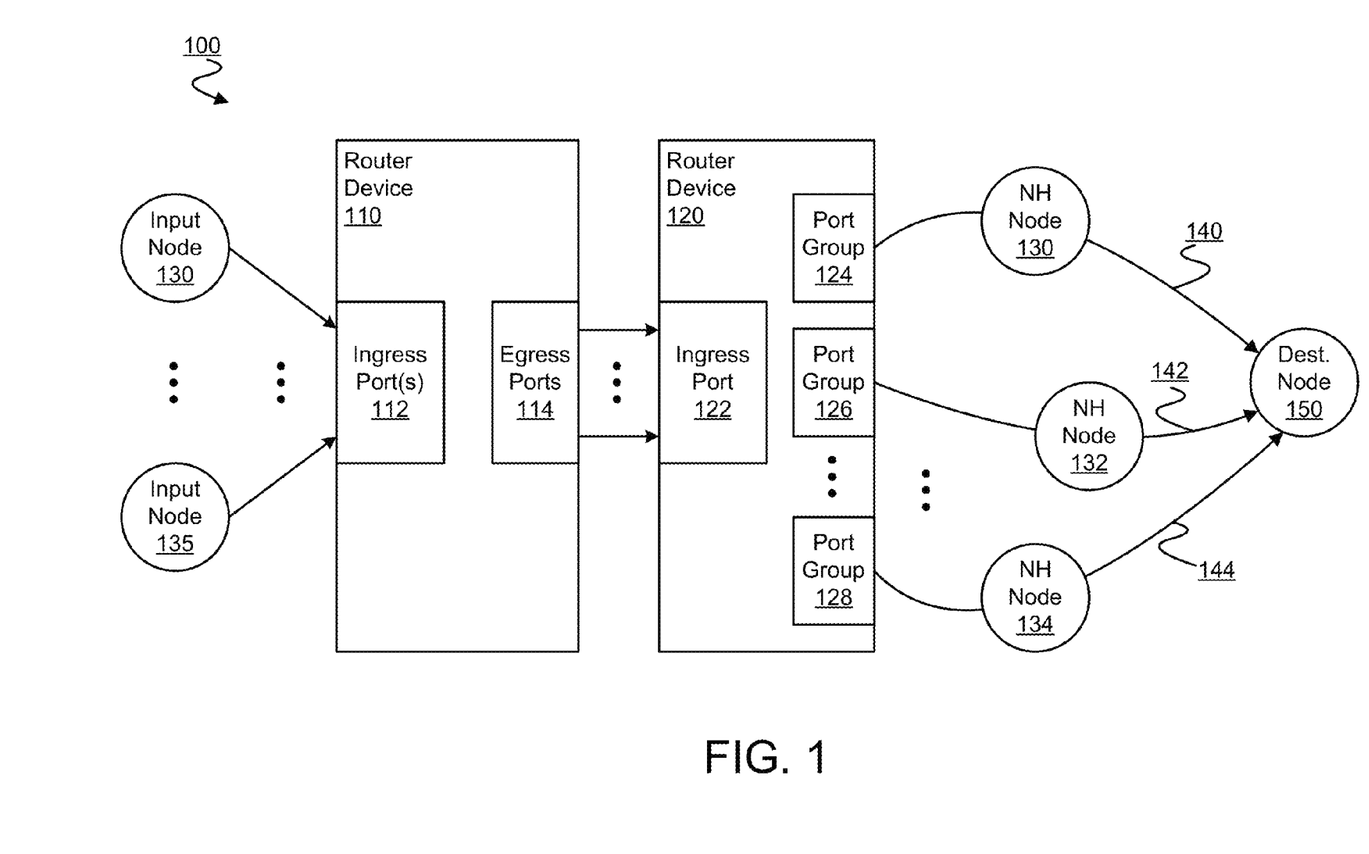
FIG. 1 is a block diagram illustrating example elements of a network for routing packets according to an embodiment.

FIG. 1 illustrates elements of a network 100 for routing data packets according to an embodiment. Network 100 may, for example, include a component network, such as a data center, which is located in a single room of a building. Additionally or alternatively, network 100 may include one or more component networks which cover a larger geographic area. By way of illustration and not limitation, network 100 may comprise one or more wired and/or wireless networks including, but not limited to a wide area network (WAN), local area network (LAN), Internet, terrestrial network, satellite network, and/or the like.

Network 100 may include a router device 110, a router device 120 coupled thereto, and a destination node 150, where router devices 110 supports ECMP routing of certain data packets (or simply "packets") to destination node 150 by router device 120. Router device 110 may support routing to select for each of multiple packets a port for a respective path in network 100 between router device 120 and destination node 150. For example, router devices 110, 120 may work together to implement a type of ECMP routing to forward IP or other such data packets to destination node 150—e.g. as Open Systems Interconnection (OSI) Layer 3 devices.

Router device 110 may include one or more ingress ports 112 to receive packets destined for destination node 150, and egress ports 114 for forwarding such packets (e.g. in a tagged or otherwise modified form) to router device 120. Router device 120 may include ingress ports 122 coupled directly or indirectly to egress ports 114 for receiving the packets destined for destination node 150.

In an embodiment, the one or more ingress ports 112 may include all ports of router device 110 which receive packets to be routed to destination node 150 via multiple network paths. Routing may, for example, be according to equal-cost multi-path (ECMP) routing techniques, although certain embodiments are not limited in this regard. For example, although certain embodiments provide features which resolve problems posed in various ECMP routing contexts, such embodiments may not be limited to use in such ECMP routing contexts. Various embodiments are discussed herein with reference to ECMP routing applications. However, such discussion may be extended to apply to other (e.g. unequal-cost) multi-path routing applications.

The paths are represented in network 100 as an illustrative set of network paths 140, 142, . . . , 144, which are not limiting on certain embodiments. By way of illustration and not limitation, ingress ports 112 may include all ports of router device 110 which are to receive packets for routing to destination node 150. The one or more ingress ports 112 may, in certain embodiments, receive packets for routing to other destination nodes and/or paths (not shown). Further, router device 110 may, in certain embodiments, include one or more additional ingress ports (not shown) for receiving packets other than those packets which are to be sent to destination node 150 via the illustrative paths 140, 142, . . . , 144.

In an embodiment, network 100 may include one or more input nodes 130, . . . , 135 to provide to the one or more ingress ports 112 certain packets destined for destination node 150. The one or more input nodes 130, . . . , 135 may variously include any of a variety of network communication devices including, but not limited to, one or more of a bridge, gateway, firewall, switch, server and/or the like. Input nodes 130, . . . , 135 may, in an embodiment, provide all packets which router device 110 is to route to destination node 150 via router device 120. Alternatively or in addition, input nodes 130, . . . , 135 may each provide to ingress ports 112 a substantially equal amount of traffic for destination node 150 over time, although certain embodiments are not limited in this regard. Router device 110 may receive other network traffic from the one or more input nodes 130, . . . , 135 and/or from one or more additional input nodes (not shown).

In network 100, router device 120 may include multiple port groups 124, 126, . . . , 128 to variously couple to destination node 150. Although discussed herein in terms of an illustrative port groups 124, 126, . . . , 128, such discussion may be extended to apply to any of a variety of additional or alternative combinations of two or more port groups of router device 120. Each of the multiple port groups 124, 126, . . . , 128 includes one or more ports (not shown), and may correspond to a respective network path to destination node 150. For example, each port of a given port group may send one or more respective packets received to destination node 150 via—e.g. only via—the network path corresponding to that port group.

In an embodiment, some or all of the ports of a given port group may also send packets to other destination nodes (not shown). Additionally or alternatively, some or all of the ports of a given port group may also receive one or more packets to be routed by router device 120. Additionally or alternatively, router device 120 may include one or more additional egress ports (not shown) for sending packets other than those sent to destination 150 via network paths 140, 142, . . . , 144.

As used herein, "network path" refers to a set of one or more network nodes and/or inter-node channels which are coupled to one another. In an embodiment, a network path may, for example, include two adjacent network nodes, where the path is inclusive of all channels between the two adjacent network nodes. Each of network paths 140, 142, . . . , 144 may include a respective one or more nodes and/or inter-node channels which is/are not included in another (e.g. any other) of network paths 140, 142, . . . , 144. In certain embodiments, one of network paths 140, 142, . . . , 144 may partially, and only partially, overlap with another of network paths 140, 142, . . . , 144. For example, although not shown in network 100, a next-hop node for router device 120 may belong to two different network paths to destination node 150, where the two network paths diverge from one another between this common next-hop node and destination node 150.

Network 100 may include next-hop nodes 130, 132, . . . , 134 for router device 120 which, respectively, belong or otherwise correspond to network paths 140, 142, . . . , 144. Next-hop nodes 130, 132, . . . , 134 may variously include any of a variety of network communication devices including, but not limited to, one or more of a bridge, gateway, firewall, switch, server and/or the like. In an embodiment, port groups 124, 126, . . . , 128 may correspond, respectively, to network paths 140, 142, . . . , 144—e.g. at least insofar as any ports in a given port group are coupled to the next-hop node for the network path corresponding to that port group.

In an embodiment, network 100 may be characterized by some topological and/or other network symmetry—e.g. at least with respect to the receiving by router device 110 of packets destined for destination node 150. For example, input nodes 130, . . . , 135 may implement with respect to one another similar or even identical connectivity with router device 110. Alternatively or in addition, input nodes 130, . . . , 135 may each have similar or even identical data communication bandwidth with router device 110. Network 100 may, for example, include a highly symmetric network such as a Clos network. In such embodiment, multiple switching points, data channels, and/or the like in network 100 may operate very much the same, at least from the point of view of router device 110. Moreover, the sending of packets from router device 110 to router device 120 may be distributed evenly across egress ports 114 over time, resulting in additional symmetry from the point of view of router device 120.

Accordingly, one or more regular patterns of data traffic may be experienced by router device 110 and/or router device 120. By having such symmetry, network 100 may exchange traffic in a very evenly distributed manner. For example, router devices 110 may receive packets for destination node 150 at similar or even identical amounts from the input nodes 130, . . . , 135. Additionally or alternatively, packets for destination node 150 may be similarly or even identically distributed among multiple routing engines (not shown) within router device 110. Certain embodiments variously exploit such symmetry to provide mechanisms for reducing the amount of routing information used to route packets to destination node 150.

Figure 2:
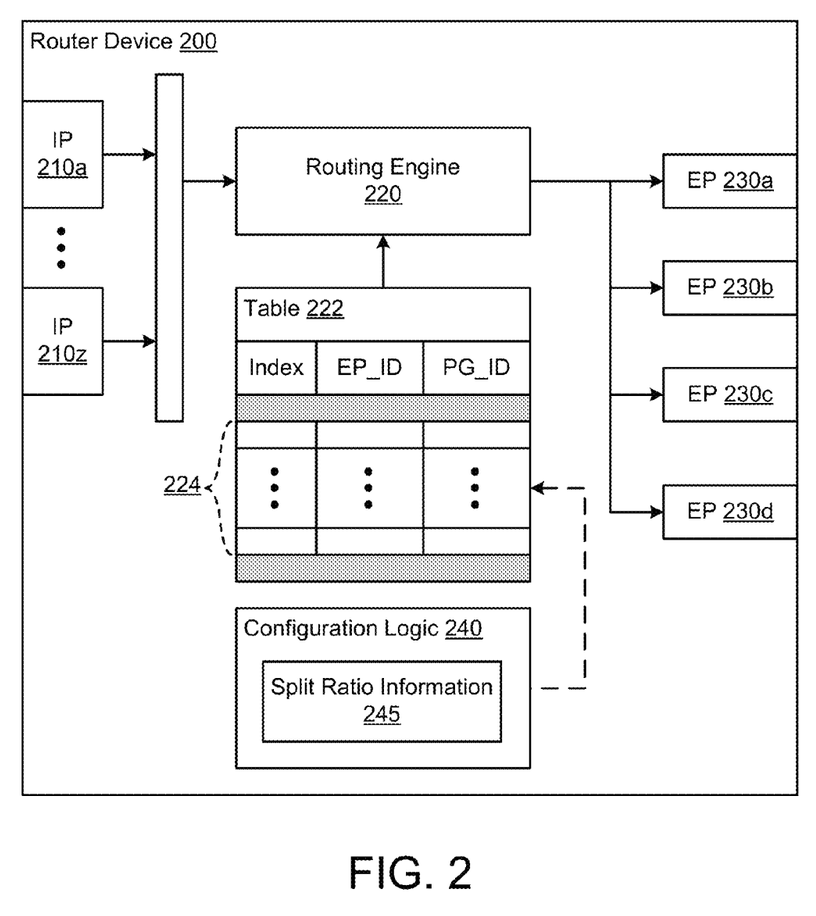
FIG. 2 is a block diagram illustrating elements of an example router device to support routing packets to a destination node according to an embodiment.

FIG. 2 illustrates select elements of a router device 200 for providing routing information according to an embodiment. Router device 200 may, for example, include some or all of the features of router device 110.

Router device 200 may receive packets to be sent to a destination device such as destination device 150 via another router device such as router device 120. Features of router device 200 are discussed herein with respect to the sending of packets to a particular destination node via a second router device. Elements of router device 200 for routing packet to the destination node in question are not necessarily limiting on whether or how elements of router device 200 might, in certain embodiments, also receive and/or route other packets in a network.

In an embodiment, router device 200 includes one or more ingress ports 210*a*, . . . , 210*z* to receive from one or more input nodes packets which are to be sent to a destination node via another router device. Although shown as including illustrative ingress ports 210*a*, . . . , 210*z*, router device 200 may include any of a variety of additional or alternative combinations of one or more such ingress ports. Router device 200 may include egress ports 230*a*, 230*b*, 230*c*, 230*d* for sending to the other router device packets received via the one or more ingress ports 210*a*, . . . , 210*z*. Although shown as including illustrative egress ports 230*a*, 230*b*, 230*c*, 230*d*, router device 200 may include any of a variety of additional or alternative combinations of multiple egress ports for sending packets to the other router device. In an embodiment, each of egress ports 230*a*, 230*b*, 230*c*, 230*d* corresponds to a different respective one of equal-cost network paths between the other router device and the destination node.

Routing information may be provided via elements within router device 200 to determine or otherwise support routing to the destination node in question. In an embodiment, router device 200 includes a routing engine 220 comprising logic—e.g. any of a variety of combinations of hardware, firmware and/or executing software—for detecting the receiving of a packet and for accessing data to support a routing of that packet (or a modified version thereof) to another network node such as the other router device, the intended destination node, and/or the like.

Routing engine 220 may, for example, perform one or more of analyzing information in a packet, searching a reference data structure to identify routing information associated with such information, optionally modifying the packet by adding and/or removing information therefrom, and initiating switching logic of router device 200 to direct the packet to a particular one of egress ports 230*a*, 230*b*, 230*c*, 230*d*. In an embodiment, routing engine 220 may include or otherwise have access to a buffer or other means (not shown) for storing a packet during such operations performed by routing engine 220.

As discussed herein, router device 200 may map its egress ports to port groups of another router device—e.g. defining for each of egress ports 230*a*, 230*b*, 230*c*, 230*d* a correspondence to only a respective one of multiple port groups of a second router device (such as port groups 124, 126, . . . , 128). For example—at least with respect to routing engine 220 sending packets destined for the destination node—routing information may dedicate egress ports 230*a*, 230*b*, 230*c*, 230*d* each to a respective one—e.g. only one—of multiple port groups of the second router device (such as port groups 124, 126, . . . , 128).

By way of illustration and not limitation, packets for the destination node which routing engine 220 sends to the second router through egress port 230*a* may be forwarded from the second router device to the destination node only through the one or more ports in a first port group of the second router device. By contrast, packets for the destination node which routing engine 220 sends to the second router through egress port 230*b* may be forwarded from the second router device to the destination node only through the one or more ports in a particular port group—e.g. different from the first port group—of the second router device. The dedications (with respect to routing to a particular destination node) of egress ports of router device 200 to respective port groups in the second router device is merely illustrative, and that router device 200 may implement any of a variety of additional or alternative such dedications.

In an embodiment, a total number of port groups of the second router is less than or equal to a total number of egress ports 230*a*, 230*b*, 230*c*, 230*d* variously dedicated to respective ones of those port groups. In such an embodiment, each of egress ports 230*a*, 230*b*, 230*c*, 230*d* may, for example, be dedicated to only one of the port groups, and each of the port groups may have one or more of egress ports 230*a*, 230*b*, 230*c*, 230*d* dedicated to it. Dedication of egress ports 230*a*, 230*b*, 230*c*, 230*d* to respective ones of the port groups may be implemented, for example, by routing information within router device 200.

For example, routing engine 220 may have access to a routing table 222 including entries to variously associate packet information with respective network routes from router device 200. Routing table 222 may include a set of one or more routing table entries 224—referred to herein as an entry set—each entry of entry set 224 for a respective sending to the second router device of a packet destined for the destination node. In an embodiment, entry set 224 includes all entries of routing table 222 which are for sending packets destined for the destination node.

In an embodiment, router device 200 may include, or otherwise couple to, configuration logic 240 comprising hardware, firmware and/or executing software to provide entry set 224 in routing table 222. Configuration logic 240 may, for example, coordinate access to bus, multiplexing, switching and/or other such mechanisms of router device 200 which exchange packets from ingress ports 210*a*, . . . , 210*z* to routing engine 220 and/or provide, based on a route identified by routing engine 220, packets to egress ports 230*a*, 230*b*, 230*c*, 230*d*. Although certain illustrative elements of such bus, multiplexing, switching and/or other such mechanisms are represented functionally in router device 200, functionality of these elements may be implemented according to any of a variety of conventional network router architecture elements, in certain embodiments.

In an embodiment, configuration logic 240 may provide entry set 224 to routing table 222 based on split ratio information 245 which describes a relative splitting of traffic to the destination node among port groups of the second router device. For example, split ratio information 245 may indicate that a first port group is to carry a first portion of traffic being routed to the destination node, and that a second port group is to carry a second portion of that traffic being routed to the packet node. In an embodiment, the first portion of traffic is different from—e.g. larger than or smaller than—the second portion of traffic.

Split ratio information 245 may specify or otherwise indicate respective shares of traffic to be carried by the port groups of the second router device—e.g. where the respective shares are specified relative to one another. By way of illustration and not limitation, split ratio information 245 may specify a first port group, second port group and third port group are to carry, respectively, two times (2×), one time (1×) and one time (1×) a basic share of all traffic being routed by the second router device via equal-cost network paths to the destination node. Based on split ratio information 245, configuration logic 240 may create, modify, or otherwise provide entry set 224 in routing table 222.

Figure 3:
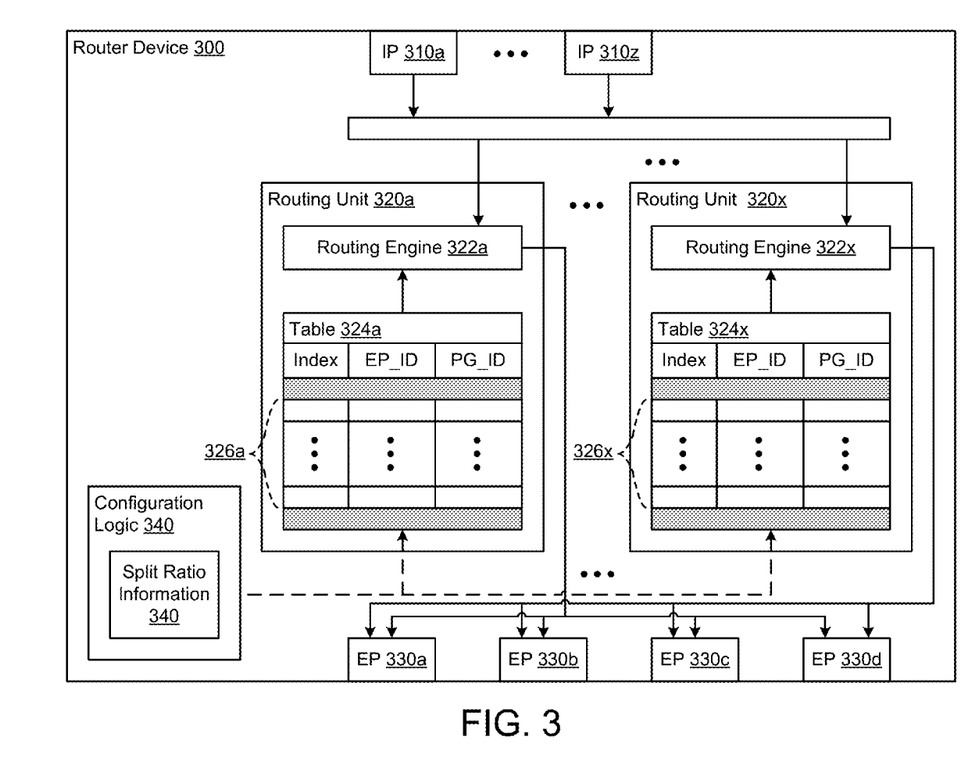
FIG. 3 is a block diagram illustrating elements of an example router device including multiple routing units to support routing packets to a destination node according to an embodiment.

FIG. 3 illustrates select elements of another router device 300 for providing routing information according to an embodiment. Router device 300 may, for example, include some or all of the features of router device 110.

As with router device 200, router device 300 may receive packets to be sent to a destination device such as destination device 150 via another router device such as router device 120. Features of router device 300 are discussed herein with respect to the routing of packets to a particular destination node via a second router device. Elements of router device 300 for routing packet to the destination node in question are not necessarily limiting on whether or how elements of router device 300 might, in certain embodiments, also receive and/or route other packets in a network.

In an embodiment, router device 300 includes one or more ingress ports 310a, ..., 310z to receive from one or more input nodes packets which are to be sent to a destination node via another router device. Although shown as including illustrative ingress ports 310a, ..., 310z, router device 300 may include any of a variety of additional or alternative combinations of one or more such ingress ports. Router device 300 may include egress ports 330a, 330b, 330c, 330d for sending to the other router device packets received via the one or more ingress ports 310a, ..., 310z. Although shown as including illustrative egress ports 330a, 330b, 330c, 330d, router device 300 may include any of a variety of additional or alternative combinations of multiple egress ports for sending packets to the other router device. In an embodiment, each of egress ports 330a, 330b, 330c, 330d corresponds to a different respective one of equal-cost network paths between the other router device and the destination node.

Routing information may be provided via elements within router device 300 to determine or otherwise support routing to the destination node in question. For example, router device 300 may include multiple routing units, represented by illustrative routing units 320a, ..., 320x. As used herein, "routing unit" refers to an autonomous set of resources for determining or otherwise supporting a routing for a packet and for initiating or otherwise providing any packet processing needed to implement the determined routing. For a given packet received by the one or more ingress ports 310a, ..., 310z, routing of the packet may be assigned to, or otherwise performed by, one of routing units 320a, ..., 320x. In an embodiment, routing units 320a, ..., 320x may each process respective packets independent of one another.

Packets to be sent to a particular destination node via the second router device may be distributed evenly among the routing units 320a, ..., 320x over time—e.g. due to ingress ports 310a, ..., 310z distributing such packets evenly among routing units 320a, ..., 320x and/or due to a symmetry of packet delivery to ingress ports 310a, ..., 310z. Routing units 310a, ..., 310x may variously include, or otherwise have access to, a respective one of routing engines 322a, ..., 322x. In an embodiment, a routing unit may include, or otherwise have access to, a buffer or other means (not shown) for storing a packet during operations performed by the routing engine of the routing unit. Router device 300 may include one or more additional routing units (not shown)—e.g. for supporting routing other than that which sends packets to the destination node via the equal-cost paths.

As discussed herein, each routing unit of routing units 320a, ..., 320x may each implement a respective dedication of egress ports 330a, 330b, 330c, 330d, where the dedication is respect to the routing engine of that routing unit sending packets destined for the destination node. Each of these dedications may dedicate egress ports 230a, 230b, 230c, 230d each to a respective one—e.g. only one—of multiple port groups of the second router device (such as port groups 124, 126, ..., 128). By way of illustration and not limitation, for a first such dedication with respect routing unit 320a, packets which routing engine 320a sends through egress port 330a may be forwarded to the destination node only through a first port group of the second router device, and packets which routing engine 320a sends through egress port 330b may be forwarded to the destination node only through a particular port group—e.g. different from the first port group—of the second router device. By contrast, for a second such dedication with respect routing unit 320x, packets which routing engine 320x sends through egress port 330a may be forwarded to the destination node only through a particular port group—e.g. different from the first port group—of the second router device, and packets which routing engine 320x sends through egress port 330b may be forwarded to the destination node only through a particular port group—e.g. different from the first port group—of the second router device. Certain embodiments are not limited with respect to whether certain egress ports may be dedicated to the same (or different) port groups of the second router device with respect to routing by a particular routing unit.

In an embodiment, a total number of port groups of the second router is less than or equal to a total number of egress ports 330a, 330b, 330c, 330d variously dedicated to respective ones of those port groups. In such an embodiment, each of egress ports 330a, 330b, 330c, 330d may, for example, be dedicated to only one of the port groups, and each of the port groups may have one or more of egress ports 330a, 330b, 330c, 330d dedicated to it. Dedication of egress ports 330a, 330b, 330c, 330d to respective ones of the port groups may be implemented, for example, by routing information within router device 300.

For example, routing engines 320a, ..., 320x may each have access to respective routing tables 322a, ..., 322x which include entries to variously associate packet information with respective network routes from router device 300. Routing tables 322a, ..., 322x may include, respectively, entry sets 326a, ..., 326x—where each entry of entry sets 326a, ..., 326x is for a respective sending to the second router device of a packet for ECMP routing to the destination node. In an embodiment, entry sets 326a, ..., 326x each include all entries of their respective routing tables 322a, ..., 322x which are for sending packets which are destined for the destination node.

In an embodiment, router device 300 may include, or otherwise couple to, configuration logic 340 comprising hardware, firmware and/or executing software to provide entry sets 326a, ..., 326x in routing tables 322a, ..., 322x. Configuration logic 340 may, for example, coordinate access to bus, multiplexing, switching and/or other such mechanisms of router device 300 which exchange packets from ingress ports 310a, ..., 310z to routing engine 320 and/or provide, based on a route identified by routing engine 320, packets to egress ports 330a, 330b, 330c, 330d. Although certain illustrative elements of such bus, multiplexing, switching and/or other such mechanisms are represented functionally in router device 300, functionality of these elements may be implemented according to any of a variety of conventional network router architecture elements, in certain embodiments. In an embodiment, configuration logic 340 may provide entry sets 326a, ..., 326x to routing tables 322a, ..., 322x based on split ratio information 345.

Figure 4:
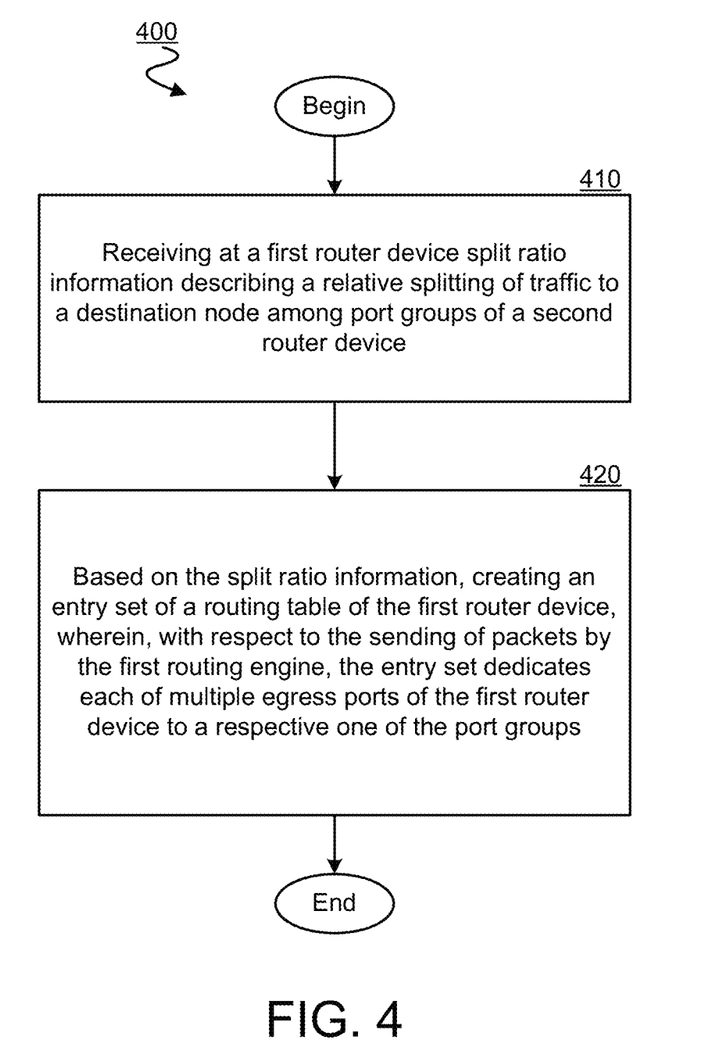
FIG. 4 is a flow diagram illustrating elements of an example method for providing multi-path routing information according to an embodiment.

FIG. 4 illustrates select elements of a method 400 for creating routing information according to an embodiment. Method 400 may be performed by configuration logic 240 and/or configuration logic 340, for example, or other such logic to configure one or more routing tables of a first router device.

In an embodiment, method 400 includes, at 410, receiving at the first router device split ratio information describing a relative splitting of traffic to a destination node among port groups of a second router device. The second router device may be coupled to the first router device via egress ports of the first router device. The port groups of the second router device may each correspond to a different respective network path to the destination node—e.g. where the network paths are equal-cost paths with respect to one another.

Based on the split ratio information, method 400 may, at 420, create an entry set of a routing table of the first router device. In an embodiment, the set of entries may map egress ports of the first router device to port groups of the second router device—e.g. defining for each of the multiple egress ports of the first router device a correspondence to only a respective one of the port groups. For example, the set of entries may, at least with respect to the first routing engine sending packets destined for the destination node, dedicate each of multiple egress ports of the first router device to a respective one of the port groups.

Figure 5:
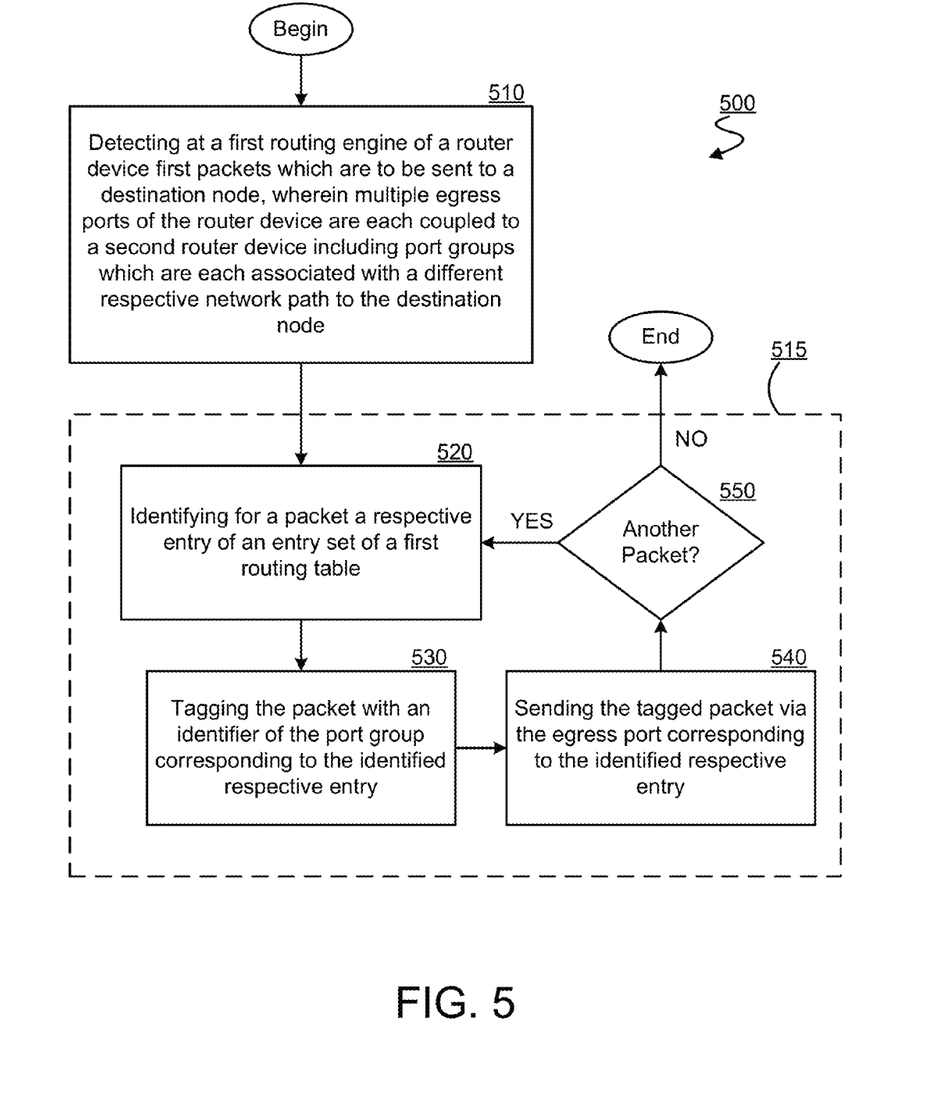
FIG. 5 is a flow diagram illustrating elements of an example method for forwarding packets based on multi-path routing information according to an embodiment.

FIG. 5 illustrates select elements of a method 500 for routing packets to a destination node according to an embodiment. Method 500 may be performed, for example, by a router device such as router device 200 or router device 300. In an embodiment, method 500 includes, at 510, detecting at a first routing engine of a router device first packets which are to be sent to a destination node. In an embodiment, multiple egress ports of the router device may each be coupled to a second router device. The second router device may, for example, include port groups which are each associated with a different respective network path to the destination node.

Furthermore, at 515, method 500 may include, the first routing engine forwarding the detected first packets based on an entry set of a first routing table, the entry set to support equal-cost multi-path (ECMP) routing of packets to the destination node. In an embodiment, forwarding the first packets includes a set of operations—e.g. operations 520, 530, 540, 550—performed for each of the first packets.

By way of illustration and not limitation, method 500 may include, at 520, identifying for a given packet a respective entry of the entry set. As discussed herein, such identifying may include determining an index value for an entry—e.g. in a set of entries which are equally likely to be selected for routing network traffic. The identifying of the entry for a packet may be based, for example, on a hash of information included in the given packet. Method may further include, at 530, tagging the given packet with an identifier of a port group corresponding to the identified respective entry. After tagging the given packet, method 500 may, at 540, send the tagged packet via the egress port which corresponds to the identified respective entry. If it is determined, at 550, that another packet of the first packets remains to be forwarded, then method 500 may return to performing operation 520—i.e. for processing that remaining packet.

Figure 6:
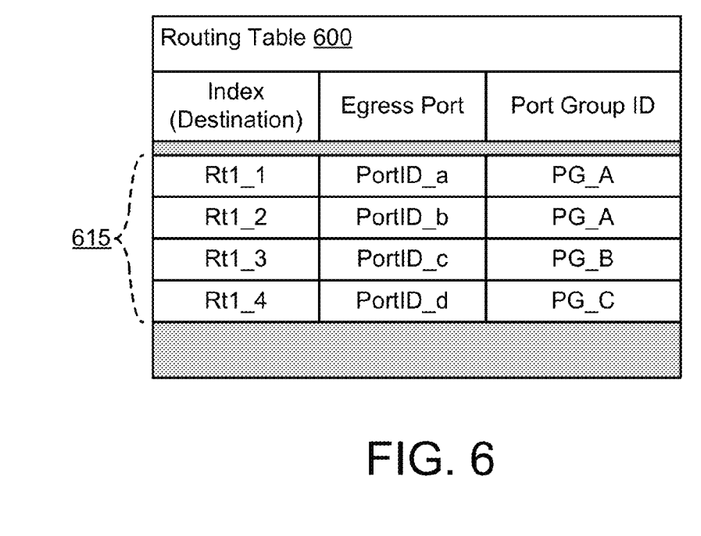
FIG. 6 is a block diagram illustrating elements of an example routing table for providing routing information according to an embodiment.

FIG. 6 illustrates select elements of a routing table 600 for supporting a routing, according to an embodiment, of packets which are destined for a destination node. Routing table 600 may be provided at a router device which is to send packets to a second router device, where the second router device is to variously route such packets to the destination node on respective ones of equal-cost network paths. Routing table 600 may, for example, include some or all of the features of routing table 222.

In the discussion of routing table 600, certain features of various embodiments are described in terms of an illustrative ECMP routing scenario in which traffic to the destination node is split among three port groups of the second router device. It should be understood that the discussion of such features may be extended to apply to any of a variety of additional or alternative traffic splitting schemes for ECMP routing. In an illustrative scenario, the second router device includes three port groups: a Group A having four (4) ports, a Group B having eight (8) ports and a Group C having twelve (12) ports. The Groups A-C may each correspond to a different respective one of equal-cost network paths to the same destination node. Split ratio information may indicate that traffic to the destination node via the Groups A-C is to be divided into shares according to the following:

| Port Group | Ports | Share(s) of Traffic to Destination Node |
|---|---|---|
| Group A | 1-4 | 2 |
| Group B | 5-12 | 1 |
| Group C | 13-24 | 1 |

The splitting of traffic to the destination node among the port groups may be characterized by a measure of granularity—e.g. where the granularity value is equal to a total number of shares for all port groups. For example, the division of traffic into a total of four (2+1+1=4) shares may correspond to a granularity value of four (4) for the splitting scheme. By contrast, a granularity of a traffic splitting scheme in another scenario may be equal to some other value—for example, one hundred (100) where the traffic splitting is specified in integer percentages of the overall ECMP traffic to a destination node. In an embodiment, a traffic splitting scheme may be normalized to reduce its granularity value—e.g. where the numbers of traffic shares allocated to the respective port groups are all divisible by some common denominator greater than one (1).

In the illustrative scenario, the router device which sends packets based on routing table 600 is coupled to the second router device via four egress ports a-d. It should be understood that any of a variety of combination of additional or alternative egress ports may couple the router device to the second router device, according to different embodiments. Furthermore, in the illustrative scenario, a single routing engine of the router device determines the sending of the packets to the second router device.

Based on the split ratio information, an entry set 615 may be provided in routing table 600, where the entry set 615 maps egress ports of the router device to port groups of the second router device—e.g. defining for each of the multiple egress ports a-d a correspondence to only a respective one of the port groups of the second router device. For example, entry set 615 may, at least with respect to a given routing engine sending packets destined for the destination node, dedicate each of egress ports a-d to a respective one of Groups A-C. In an embodiment, a ratio of the total number of entries in entry set 615 which indicate one particular port group to the total number of entries in entry set 615 which indicate some other port group may be equal to, or otherwise based on, a ratio of the traffic to be split among those port groups. By way of illustration and not limitation, the indicated 2-1-1 splitting of traffic among Groups A, B and C, respectively, may lead to configuration logic identifying (1) that a certain number of entries in entry set 615 are to be dedicated to routing packets for Group B, (2) that the same number of entries in entry set 615 are to be dedicated to routing packets for Group C, and (3) that twice that number of entries in entry set 615 are to be dedicated to routing packets for Group A. In an embodiment, the total number of entries in entry set 615 is equal to a granularity value for the traffic splitting scheme, although certain embodiments are not limited in this regard.

With access to routing table 600, a routing engine may evaluate information in a received packet—e.g. by performing a hash of destination address information, flow identifier information, and/or the like—to calculate an index value for an entry in entry set 615. Entry set 615 may, for example, represent a set of entries which are equally likely to be selected for use in routing network traffic, although certain embodiments are not limited in this regard. Based on the calculated index value, a corresponding entry of entry set 615 may be identified. The identified entry may include, or otherwise be associated with, an egress port identifier and a port group identifier. Based on the port group identifier associated with the entry, the routing engine may tag the packet by adding information identifying the port group indicated by the port group identifier. Based on the egress port identifier associated with the entry, the routing engine may send the tagged packet via the identified egress port of the router device.

In an embodiment, an approximation of a split ratio between port groups of the second router device may be used to allow a smaller total number of entries in an entry set of the router device. In an illustrative scenario, eight (8) egress ports I-VIII of a router device may support ECMP routing to the destination node via a second router device, where a traffic splitting scheme specifies a 1:4 splitting between a first port group and a second port group of the second router device. In such a scenario, egress ports I and II may be dedicated for a routing engine of the router device to send packets destined for the destination node only via the first port group, while ports III-VIII may be dedicated for the routing engine to send packets destined for the destination node only via the second port group. Such a dedicating of egress ports will produce an approximate ratio of 1:3 instead of 1:4. The underlying assumption here is that the second router will mix the traffic evenly while sending the packets on to the destination node.

This provides the advantage of using only 8 entries in an entry set of the router device instead of 8×(1+4)=40. The approximation will get closer with larger multiples of eight entries in the entry set. For example, two entries per port, or a total of 16 entries in the entry set, allows a 3:13 split ratio between the first port group and the second port group, which is closer to 1:4.

Figure 7:
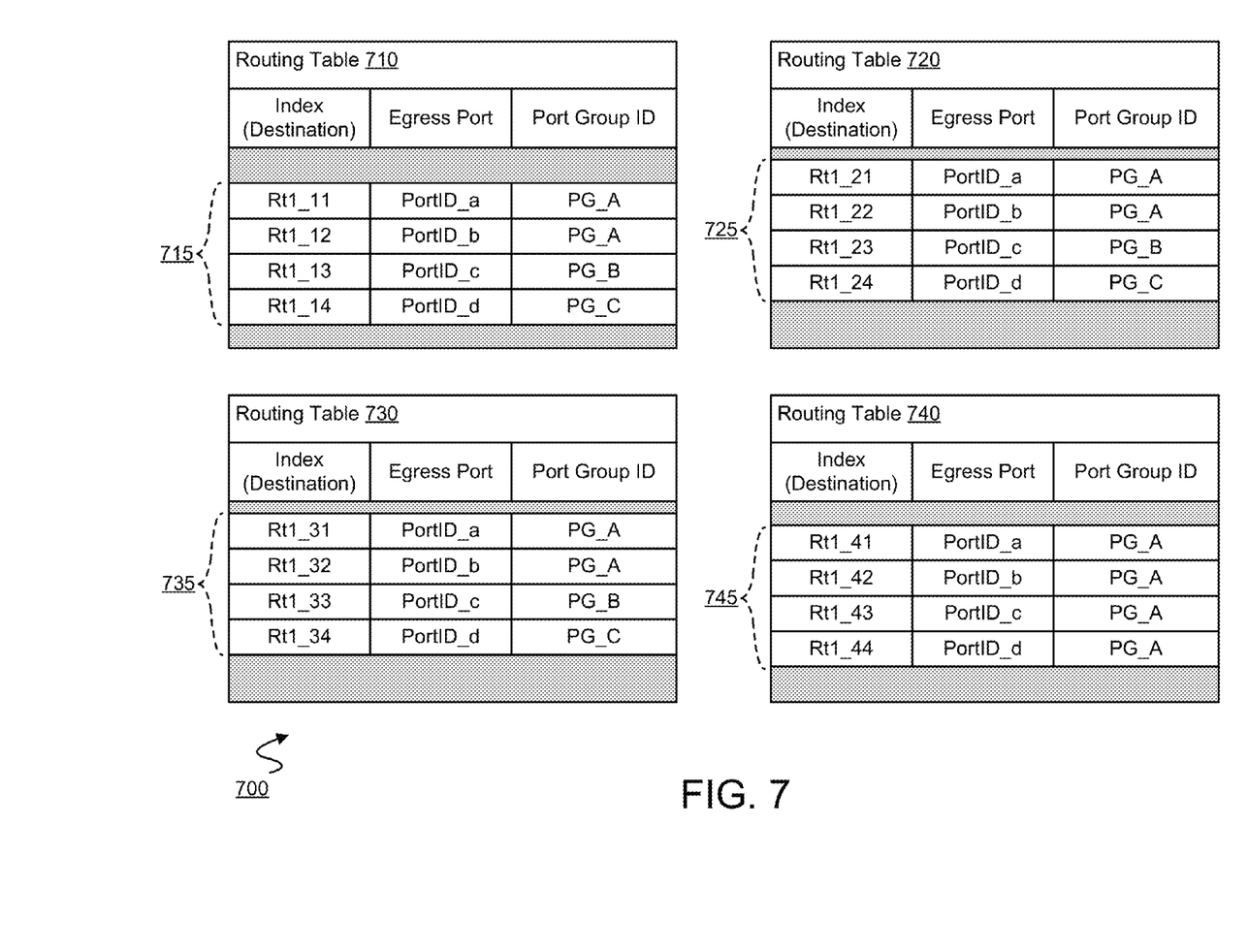
FIG. 7 is a block diagram illustrating elements of an example set of routing tables for providing routing information according to an embodiment.

FIG. 7 illustrates select elements of routing information 700 for routing packets to a destination node according to an embodiment. Routing information 700 may be provided at a router device which is to send packets to a second router device, where the second router device is to variously route such packets on respective ones of equal-cost network paths to the destination node. Routing information 700 may, for example, include some or all of the features of routing tables 324a, . . . , 324x.

In the discussion of routing information 700, certain features of various embodiments are described in terms of another illustrative ECMP routing scenario, which is not limiting on certain embodiments. In this scenario, although a router device is again coupled via four egress ports a-d to a second router device having three port groups (Groups A-C), split ratio information indicates that traffic to the destination node via the Groups A-C is to be divided into shares according to the following:

| Port Group | Ports | Share(s) of Traffic to Destination Node |
|---|---|---|
| Group A | 1-4 | 10 |
| Group B | 5-12 | 3 |
| Group C | 13-24 | 3 |

In an embodiment, routing information 700 may include routing tables 710, 720, 730, 740. Each of routing tables 710, 720, 730, 740 may, for example, correspond to a different respective routing engine of the router device which is to send packets to the second router device. Each of the routing engines may perform routing based on a respective one of the routing tables 710, 720, 730, 740 which is specific to that routing engine.

Based on split ratio information indicating the 10-3-3 splitting scheme, configuration logic may provide to routing tables 710, 720, 730, 740 respective entry sets 715, 725, 735, 745. In an embodiment, entry sets 715, 725, 735, 745 may each include all entries of their respective routing tables 710, 720, 730, 740 which are for packets that are to be exchanged via the set of equal-cost paths between the second router and the destination node. For example, entry sets 715, 725, 735, 745 may each include all entries of their respective routing tables 710, 720, 730, 740 which are for forwarding to the second router packets which are destined for the destination node.

For each of entry sets 715, 725, 735, 745, the entry set may provide a respective mapping of each of egress ports a-d to a respective port group of the second router device—e.g. each of entry sets 715, 725, 735, 745 defining for each of the multiple egress ports a-d a respective correspondence to only a respective one of the port groups of the second router device. In an embodiment, each of entry sets 715, 725, 735 variously dedicates the egress ports a-d each to a respective port group of the second router device. Such dedication by any one of entry sets 715, 725, 735 may be at least with respect to the sending of packets destined for the destination node by the routing engine which corresponds to that entry set.

For example, the illustrative entries in entry set 715 associate egress ports a and b with Group A, egress port c with Group B, and egress port d with Group C. By contrast, the illustrative entries in entry set 745 associate each of egress ports a-d with Group A. In an embodiment, each entry set includes a total number of entries which is equal to the number of egress ports of the router device which support the second router's ECMP routing to the destination node.

Additionally or alternatively, a total number of entries in all of the entry sets 715, 725, 735, 745 may be equal to a granularity of the split ratio information. For example, routing tables 710, 720, 730, 740 may each correspond to a respective one of routing engines which were selected from a larger number of routing engines to support the second router's ECMP routing to the destination node. The total number of routing engines to be selected may be based, for example, on the split ratio information—e.g. based on a granularity value—and/or a number of egress ports for supporting the second router's ECMP routing to the destination node.

The respective total numbers of egress ports which entry sets 715, 725, 735, 745 as a whole associate with each port group may be based on the traffic splitting scheme. For example, a ratio of the total number of egress ports which entry sets 715, 725, 735, 745 as a whole associate with one port group to the total number of egress ports which entry sets 715, 725, 735, 745 as a whole associate with another port group may be equal to a ratio of the traffic to be split among those port groups.

By way of illustration and not limitation, entry sets 715, 725, 735, 745 as a whole support the 10-3-3 traffic splitting scheme with ten entries for Group A, three entries for Group B and three entries for Group C. Moreover, for equal utilization of the egress ports supporting ECMP routing by the second router device, each of the entry sets 715, 725, 735, 745 includes a single respective entry for each of egress ports a-d.

With access to routing information 700, routing engines of the router device may evaluate information in respective received packets—e.g. by performing a hash of destination address information, flow identifier information, and/or the like—to calculate respective index values. Based on the calculated index values, corresponding entries of entry sets 715, 725, 735, 745 may be identified. In an embodiment, one or more of entry sets 715, 725, 735, 745 each represent a set of entries which are equally likely to be selected for use in routing packets in network traffic. The identified entries may each include, or otherwise be associated with, respective egress port identifiers and respective port group identifiers. Based on the port group identifiers associated with the entries, the routing engines may variously tag the received packets by adding information identifying the respective port groups indicated by the port group identifiers. Based on the egress port identifiers associated with the entries, the routing engines may variously send the tagged packets via the respective identified egress ports of the router device.

Figure 8:
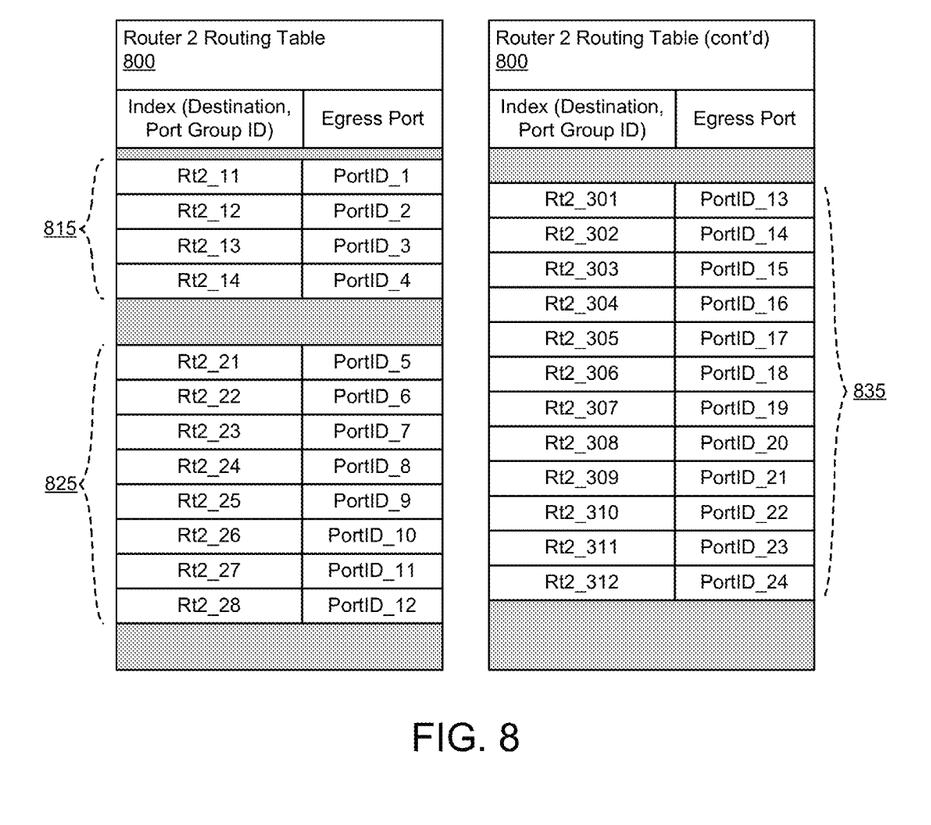
FIG. 8 is a block diagram illustrating elements of an example routing table which is accessed for routing packets to a destination node according to an embodiment.

FIG. 8 illustrates select elements of a set of a routing table 800 for routing packets to a destination node according to an embodiment. By way of illustration and not limitation, routing table 800 may be provided at a router device—such as router device 120—which receives from another router device packets which are destined for a destination node. In an embodiment, the received packets have been variously tagged by the other router device with respective identifiers of port groups of the router device—e.g. as described herein with reference to routing table 600 and/or routing information 700.

In the discussion of routing table 800, certain features of various embodiments are described in terms of an illustrative ECMP routing scenario similar to those discussed above. In this scenario, the router device includes egress ports comprising port groups which each correspond to a different respective network path to the destination node—e.g. where the network paths are equal-cost paths with respect to one another. By way of illustration and not limitation, the router device may include the same Group A (4 ports), Group B (8 ports) and Group C (12 ports) of the scenarios discussed herein with reference to routing table 600 and routing information 700. For any given one of the port groups, the one or more ports in that port group are each coupled to the network path corresponding to that port group.

Since the packets received from the other router device are variously tagged with respective port group identifier information, routing table 800 can support ECMP routing of the packets according to a particular traffic splitting scheme. Due to the port group-based tagging of packets by the other router device, the number of routing table entries needed in routing table 800 to support such routing is relatively small, compared to the number of routing table entries needed to implement such routing according to other techniques. For example, routing table 800 can support ECMP routing with entry sets 815, 825, 835 which correspond to different respective equal-cost paths—e.g. network paths 140, 142, 144.

In an embodiment, each of entry sets 815, 825, 835 includes one—e.g. only one—respective entry for each port of a port group corresponding to that entry set. The router device may evaluate information in a received packet to determine an index value for identifying an entry in entry sets 815, 825, 835. In an embodiment, one or more of entry sets 815, 825, 835 each represent a set of entries which are equally likely to be selected for use in routing packets in network traffic. The index value may be determined, for example, based upon a hash of a destination address, a port group identifier tag, a flow identifier, and/or the like. An egress port identifier may be included in, or otherwise associated with, the identified entry. Based on the egress port identifier, the router device may send the packet to the destination path via the identified egress port. Optionally, the router device may modify the packet before sending it via the identified egress port—e.g. to add routing information in aid of the packet being forwarded to the destination node.

In an embodiment, the same entry sets 815, 825, 835 may support ECMP routing according to many different traffic splitting schemes. Since the other router device may tag packets based on split ratio information, it may be sufficient for entry sets 815, 825, 835 to merely provide one entry for each egress port of the router device which is to support the ECMP routing to the destination node. Accordingly, entry sets 815, 825, 835 can supplement tagging performed using routing table 600 to implement a 2-1-1 traffic splitting scheme, or supplement tagging performed using routing information 700 to implement a 10-3-3 traffic splitting scheme.

Techniques and architectures for providing routing information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A router device comprising:
a first routing engine to receive packets which are to be sent to a destination node;
multiple egress ports coupled to the first routing engine, each of the multiple egress ports to couple to another router device having port groups each corresponding to a different respective network path to the destination node, wherein for each of the port groups of the other router device, each egress port of the port group couples the other router device to the destination node via the corresponding network path, wherein one or more of the port groups includes a plurality of egress ports;
a first routing table including an entry set for multi-path routing of the packets to the destination node, each entry of the entry set corresponding to a respective one of the multiple egress ports of the router device and to a respective one of the port groups of the other router device, wherein the entry set maps each of the multiple egress ports to a respective one of the port groups in the other router device, wherein the first routing engine includes routing logic to identify for a packet a respective entry of the entry set, to tag the packet by including in the packet a port group identifier for the port group of the other router device which corresponds to the identified respective entry, and to send the tagged packet via the egress port corresponding to the identified respective entry; and
configuration logic to receive split ratio information describing a relative splitting of traffic to the destination node among the port groups, the configuration logic further to create the entry set based on the split ratio information, wherein the configuration logic to create the entry set based on the split ratio information includes the configuration logic to determine an approximation of the relative splitting of traffic to the destination node among the port groups.

2. The router device of claim 1, wherein the split ratio information indicates that a first amount of traffic to the destination node via a first one of the port groups is larger than a second amount of traffic to the destination node via a second one of the port groups.

3. The router device of claim 1, wherein the first routing engine is one of multiple routing engines of the router device, and wherein the first routing table is one of multiple routing tables of the router device, each of the multiple routing tables corresponding to a different respective one of the multiple routing engines.

4. The router device of claim 3, wherein each of the multiple routing tables includes a respective entry set for the destination node, each entry set corresponding to a respective one of the multiple egress ports and to a respective one of the port groups.

5. The router device of claim 4, wherein the configuration logic to create for each of the multiple routing engines the respective entry set based on the split ratio information.

6. The router device of claim 5, wherein the configuration logic to create for each of the multiple routing engines the respective entry set based on the split ratio information includes the configuration logic to determine an approximation of the relative splitting of traffic to the destination node among the port groups.

7. A method comprising:
receiving at a first routing engine of a router device packets which are to be sent to a destination node, wherein multiple egress ports of the router device are each coupled to another router device, wherein the other router device includes port groups which are each corresponding to a different respective network path to the destination node, wherein for each of the port groups of the other router device, each egress port of the port group couples the other router device to the destination node via the corresponding network path, wherein one or more of the port groups includes a plurality of egress ports; and
forwarding the received packets by the first routing engine, the forwarding based on an entry set of a first routing table, the entry set for multi-path routing of packets to the destination node, each entry of the entry set corresponding to a respective one of the multiple egress ports of the router device and to a respective one of the port groups of the other router device, wherein the entry set maps each of the multiple egress ports to a respective one of the port groups in the other router device, the forwarding including:
identifying for a packet a respective entry of the entry set;
tagging the packet by including in the packet a port group identifier for the port group of the other router device which corresponds to the identified respective entry;
sending the tagged packet via the egress port corresponding to the identified respective entry; and
receiving split ratio information describing a relative splitting of traffic to the destination node among the port groups; and
creating the entry set based on the split ratio information, wherein creating the entry set based on the split ratio information includes determining an approximation of the relative splitting of traffic to the destination node among the port groups.

8. The method of claim 7, wherein the split ratio information indicates that a first portion of traffic to the destination node via a first one of the port groups is larger than a second portion of traffic to the destination node via a second one of the port groups.

9. The method of claim 7, wherein the first routing engine is one of multiple routing engines of the router device, and wherein the first routing table is one of multiple routing tables of the router device, each of the multiple routing tables corresponding to a different respective one of the multiple routing engines.

10. The method of claim 9, wherein each of the multiple routing tables includes a respective entry set for the destination node, each entry set corresponding to a respective one of the multiple egress ports and to a respective one of the port groups.

11. The method of claim 10, wherein, for each of the multiple routing engines, the respective entry set is created based on the split ratio information.

12. The method of claim 11, wherein creating for each of the multiple routing engines the respective entry set based on the split ratio information includes determining an approximation of the relative splitting of traffic to the destination node among the port groups.

13. Non-transitory computer-readable storage media having stored thereon instructions which, when executed by one or more processing units, cause the one or more processing units to perform a method comprising:

receiving at a first routing engine of a router device packets which are to be sent to a destination node, wherein multiple egress ports of the router device are each coupled to another router device, wherein the other router device includes port groups which are each corresponding to a different respective network path to the destination node, wherein for each of the port groups of the other router device, each egress port of the port group couples the other router device to the destination node via the corresponding network path, wherein one or more of the port groups includes a plurality of egress ports; and forwarding the received packets by the first routing engine, the forwarding based on an entry set of a first routing table, the entry set for multi-path routing of packets to the destination node, each entry of the entry set corresponding to a respective one of the multiple egress ports and to a respective one of the port groups of the other router device, wherein the entry set maps each of the multiple egress ports of the router device to a respective one of the port groups in the other router device, the forwarding including:

identifying for a packet a respective entry of the entry set;

tagging the packet by including in the packet a port group identifier for the port group of the other router device which corresponds to the identified respective entry;

sending the tagged packet via the egress port corresponding to the identified respective entry; and receiving split ratio information describing a relative splitting of traffic to the destination node among the port groups; and creating the entry set based on the split ratio information, wherein creating the entry set based on the split ratio information includes determining an approximation of the relative splitting of traffic to the destination node among the port groups.

14. The computer-readable storage media of claim 13, wherein the first routing engine is one of multiple routing engines of the router device, and wherein the first routing table is one of multiple equal-cost multi-path routing tables of the router device, each of the multiple routing tables corresponding to a different respective one of the multiple routing engines.

15. The computer-readable storage media of claim 14, wherein each of the multiple routing tables includes a respective entry set for the destination node, each entry set corresponding to a respective one of the multiple egress ports and to a respective one of the port groups.

16. The computer-readable storage media of claim 14, wherein, for each of the multiple routing engines, the respective entry set is created based on the split ratio information.

17. The computer-readable storage media of claim 16, wherein creating for each of the multiple routing engines the respective entry set based on the split ratio information includes determining an approximation of the relative splitting of traffic to the destination node among the port groups.

* * * * *

UNITED STATES PATENT AND TRADEMARK OFFICE
CERTIFICATE OF CORRECTION

PATENT NO. : 8,873,567 B1  Page 1 of 1
APPLICATION NO. : 13/278111
DATED : October 28, 2014
INVENTOR(S) : Mandal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 207 days.

Signed and Sealed this
Sixth Day of June, 2017

Michelle K. Lee
*Director of the United States Patent and Trademark Office*